United States Patent [19]

Grunewald-Kirstein

[11] 3,843,814

[45] Oct. 22, 1974

[54] METHOD FOR PREPARING COATED POPCORN

[76] Inventor: Ingeborg Grunewald-Kirstein, Handelsstrasse 1, Eppelheim, Germany

[22] Filed: July 18, 1972

[21] Appl. No.: 272,728

Related U.S. Application Data

[63] Continuation-in-part of Ser. No. 197,484, Nov. 10, 1971, abandoned, which is a continuation-in-part of Ser. No. 18,324, March 10, 1970, abandoned.

[30] Foreign Application Priority Data

Dec. 9, 1969 Germany.............................. 1961745

[52] U.S. Cl...................... 426/307, 426/93, 426/99
[51] Int. Cl............................................. A23l 1/18
[58] Field of Search.......................... 99/83; 426/307

[56] References Cited
UNITED STATES PATENTS

| | | | |
|---|---|---|---|
| 2,518,247 | 8/1950 | Nairn | 99/83 |
| 3,704,133 | 11/1972 | Kracauer | 99/83 |

FOREIGN PATENTS OR APPLICATIONS

| | | | |
|---|---|---|---|
| 675,656 | 12/1963 | Canada | 99/83 |
| 137,638 | 6/1950 | Australia | 99/83 |

Primary Examiner—Raymond N. Jones
Attorney, Agent, or Firm—Toren, McGeady and Stanger

[57] ABSTRACT

A method of manufacturing popcorn coated with a substantially continuous layer of sugar or caramel is disclosed. A liquid coating mass is first prepared by heating edible oil or fat to form a hot liquid in which sugar or syrup is dissolved. The amount of the sugar or syrup is such that it comprises at least one half of the liquid coating mass thus obtained. Raw corn kernels are then added to the hot liquid while the coating mass is at a temperature above the popping temperature of the kernels but below the boiling temperature of the mass. The kernel containing coating mass is maintained above the popping temperature of the kernels until the moisture in the kernels has evaporated.

7 Claims, No Drawings

METHOD FOR PREPARING COATED POPCORN

CROSS REFERENCE TO PRIOR APPLICATIONS

This is a continuation-in-part of Ser. No. 197,484 filed Nov. 10, 1971 which, in turn, was a continuation of Ser. No. 18,324 filed Mar. 10, 1970, both now abandoned.

FIELD OF INVENTION

The invention relates to a procedure for coating popcorn with a sugar or caramel layer.

BACKGROUND INFORMATION AND PRIOR ART

Popcorn is conventionally prepared by heating raw corn kernels in the presence of lightly salted or sweetened vegetable oil. The heating is effected for a short period of time and above the boiling point of water. Corn kernels contain generally about 12% by weight of water. Water evaporates under the conditions of the treatment and leads to spontaneous cracking at the surface of the corn kernels whereby the inside of the kernels is turned outwardly. The kernels thus popped have a volume which is about 25 to 35 times larger than that of the unpopped corn kernels.

For the purpose of manufacturing caramel popcorn, to wit, a popcorn which is coated with carmelized sugar, raw corn is usually first popped in a dry roasting machine. The caramel coating mass is then prepared in suitable vessels from sugar, corn syrup, oil, butter, salt and other additives. This mass is constantly stirred while being heated until the prescribed melting time has been reached. In a further step, the previously popped corn is then coated with the caramel mass, usually in so-called hydraulic caramel-corn mixers or drum mixers. Chocolate popcorn, to wit, popcorn coated with a mass containing chocolate and sugar is conventionally prepared in a similar manner.

The known procedures for preparing coated popcorn have several serious shortcomings and drawbacks. Thus, the procedure is time-consuming and requires several distinct operations. Moreover, the expenditure in respect of labor and equipment is considerable. All this adds to the expense of the procedure and thus the final product, thereby adversely affecting economical considerations and a widespread sale of coated popcorn as a mass produced product. Attempts to overcome these drawbacks have not met with success.

In addition to the drawbacks mentioned above, coated popcorn prepared according to conventional procedures has a relatively short shelf life since the coated popcorn has a tendency to lose its crispiness and to become soggy after a relatively short period of time.

SUMMARY OF THE INVENTION

It is the primary object of the present invention to overcome the drawbacks of prior art procedures and to propose a method which results in the production of coated popcorn of superior quality.

It is also an object of the present invention to propose a method for the indicated purpose which is essentially a one step procedure which can be carried out within a very short period of time and without requiring elaborate equipment.

Another object of the invention is to provide a procedure of the indicated kind which is extremely simple to carry out thus, not requiring elaborate skill of the operator.

Still another object of the invention is to provide a method of the indicated kind which results in coated popcorn which has a long shelf life and retains its crispiness and freshness for over a long period of time.

Generally it is an object of the invention to improve on the art of making coated popcorn as presently practised.

Briefly and in accordance with the invention, popcorn coated with a substantially continuous layer of sugar or caramel is manufactured as follows:

First a liquid coating mass is prepared by heating edible oil or fat to form a hot liquid. Sugar or syrup is then added to the hot liquid. The sugar or syrup dissolves in the hot liquid substantially instantaneously. The amount of sugar or syrup is chosen so that it comprises at least one half of the liquid coating mass thus obtained. Raw corn kernels are then added to this liquid coating mass while the coating mass is at a temperature above the popping temperature of the kernels but at least about 20° to 30° C below the boiling temperature of the mass. The kernels are thus popped and coated with the mass. Since the kernels contain an appreciable amount of water, they are maintained in the hot coating mass until the moisture in the kernels has evaporated. Experience has indicated that within about 2 to 4 minutes the water in the kernels has disappeared. In a preferred embodiment the kernels are thus maintained within the hot coating mass for 2 to 4 minutes. Generally, 3 minutes are sufficient.

As previously stated, the kernels are added to the coating mass at a temperature which is above the popping temperature of the kernels but at least about 20° to 30° C below the boiling temperature of the mass. It has been found that a preferred temperature range is about between 180° to 220° C, excellent results being obtained at a temperature of 200° C. The exact temperature to be chosen will, of course, be somewhat dependent on the nature of the edible oil or fat and the amount of sugar or syrup. The edible oil or fat is preferably a vegetable oil or fat. In a preferred embodiment of the invention sugar instead of syrup such as corn syrup is added to the oil or fat.

In a preferred embodiment of the invention the coating mass is prepared from about 250 to 300 parts by weight of edible oil or fat such as a suitable vegetable oil or fat and about 550 to 700 parts by weight of sugar or syrup. 300 to 400 parts by weight of raw corn kernels are then added to this coating mass.

The coating mass may, of course, also contain flavoring substances and/or food colorants.

From a practical point of view, the fat or oil is first heated and the sugar or syrup is dissolved in the hot fat or oil. It has been found that the sugar dissolves almost instantaneously and the resulting coating mass is thus tantamount to a hot liquid bath. The raw kernels are then fed into the hot bath.

Extensive tests have surprisingly indicated that coated popcorn manufactured in accordance with the inventive procedure has a significantly longer shelf life than coated popcorn produced according to conventional methods. Further, a more even and uniform coating of the kernels is accomplished. While conventionally produced coated popcorn loses its crispiness after a storage period of about 3 months, and has a tendency to become soggy and rancid, coated popcorn produced in accordance with the present invention can be successfully stored for at least 12 months without affecting the initial crispiness. Moreover, no rancidity could be detected after a storage period of 12 months.

Due to the significantly increased storage capability of the inventive popcorn without any reduction in the quality, the inventive popcorn constitutes a marked improvement as compared to conventional popcorn products. In this context it will be appreciated that the storage capability or shelf life of popcorn is an important factor in the marketability of the product.

Although applicant does not want to be limited by any theories advanced by her, it is believed that the increase in the storage capability of the inventive popcorn product is due to the fact that the moisture initially contained in the kernels is completely expelled by the inventive procedure. This, of course, prevents moisture migration, for example, from the sugar coating into the popped kernels proper, which latter effect negatively affects the crispiness of the product. It is therefore important for the success of the present procedure that the moisture initially contained in the kernels is completely removed. For this reason it is necessary to maintain the kernels in the hot coating bath for a sufficient period of time so as to completely expel the moisture.

The invention will now be described by several examples, it being understood that these examples are given by way of illustration and not by way of limitation and that many changes may be effected without affecting in any way the scope and spirit of the invention as recited in the appended claims.

EXAMPLE 1

270 gram of unhardened vegetable fat were heated to about 200°C. 630 gram of sugar were added to the fat bath under stirring. The sugar dissolved substantially instantaneously in the liquid fat. The temperature was maintained at 200°C and 350 grams of raw corn kernels were added to the coating mass consisting of the sugar enriched fat bath, under agitation. The temperature of the mixture thus obtained was maintained at the 200°C value for about 3 minutes whereupon the mixture was allowed to cool. Caramel coated popcorn completely devoid of moisture was obtained.

The above experiment yields substantially the same results if the conditions are varied as follows:

| | |
|---|---|
| Edible oil or fat | 250 to 300 grams |
| Sugar | 550 to 700 grams |
| Corn kernels | 300 to 400 grams |
| Temperature | 180 to 220°C |

Time period within which kernels are maintained within hot coating mass: 2 to 4 minutes.

EXAMPLE 2

Popcorn with fruit flavor - red a. 300 grams of unhardened vegetable fat are charged into a popcorn roaster (Cretor's "Holiday") to which are added 6 g spray-dried natural orange powder (essence for candies) and a pinch of strawberry red (artificial food coloring). The fat is heated to 220°C and 690 grams of sugar are dissolved therein. 400 grams of corn kernels are then added while maintaining the temperature at 220°C. Roasting is carried out in a conventional manner. Within about 3 minutes, the corn is popped open and candied. It may be wrapped immediately in bags.

b. 270 g unhardened vegetable fat
  6 g spray-dried natural orange powder
  0.5 cc strawberry red (food coloring) are charged into a popcorn roaster and heated to a melt. 560 grams of sugar are dissolved in the melt. Into the coating mass thus obtained 300 g raw corn is poured. Within 3 minutes, the kernels pop open and are simultaneously evenly coated with the hot sugar-containing mass by means of a stirrer provided in the popcorn roaster.

EXAMPLE 3

Popcorn with peppermint flavor - green a. 250 g unhardened vegetable fat are charged into the popcorn roaster, then 3 cc pure peppermint oil and a pinch of peppermint green (food coloring) is added. 550 grams of sugar are dissolved in the melt and 300 grams of kernels are added. Within 3 minutes the candied popcorn is ready to be packed.

b. 300 g unhardened vegetable fat
  3 cc pure peppermint oil
  0.5 cc peppermint green (food coloring) are charged into a popcorn roaster and melted. 700 grams of sugar are added. Into the coating mass thus obtained, 385 g raw corn are poured. Within 3 minutes the kernels pop open and are simultaneously evenly coated with the hot, sugar-containing mass by means of a stirrer provided in the popcorn roaster.

With a view to obtaining a uniform product, the coating mass should be agitated during and after the addition of the corn kernels. The agitation may be effected in any desired manner for example, by a stirrer, by tumbling or the like.

While it has previously been difficult to prepare candied popcorn, the inventive procedure can be carried out in conventional machinery of the kind available at fairs, amusement parks, in the lobbies of movie theaters and the like. It should be emphasized that the popping of the corn is carried out in the coating mass while the mass is above its melting point but below its boiling point. In this manner a true bath is obtained. By maintaining the coating mass in a liquid state at a temperature which is at least 20° to 30°C below its boiling point, overheating is successfully prevented while at the same time assuring complete removal of the moisture in the kernels.

As is clear from the above description, at least one half of the coating mass consists of sugar or syrup.

As previously stated, the coating mass may also contain flavoring and/or coloring substances. Thus, popcorn with various tastes can be obtained. Apart from the caramel popcorn there may be grape flavored popcorn, and popcorn having the following flavors: vanilla, nut, woodruff, rum, arak, coffee, cream, butter, mocca, chocolate and others. Finally, colored popcorn can be made by using one of the colorants conventional in food coloring.

What is claimed is:

1. A method of manufacturing popcorn coated with a substantially continuous layer of sugar or caramel, which comprises:

a. preparing a liquid coating mass by first heating edible oil or fat to form a hot liquid and then dissolving sugar or syrup in the hot liquid in an amount such that the sugar or syrup comprises at least one half of the liquid coating mass thus obtained, b. adding raw corn kernels to the hot liquid coating mass while the coating mass is at a temperature above the popping temperature of the kernels but at least about 20°–30°C below the boiling temperature of the mass said temperature being about 200°C, whereby the kernels are popped and coated with said mass and c. maintaining the temperature of (b) until the moisture in the kernels has evaporated.

2. A method as claimed in claim 1, wherein the temperature of (b) is maintained in step (c) for about 2 – 4 minutes.

3. A method as claimed in claim 1, wherein the temperature of (b) is maintained in step (c) for about 3 minutes.

4. A method as claimed in claim 1, wherein the coating mass of (a) comprises
1. between about 250–300 parts by weight of edible oil or fat;
2. between about 550–700 parts by weight of sugar or syrup and about 300–400 parts by weight of corn kernels are added to said coating mass in step (b).

5. A method as claimed in claim 1, wherein the coating mass comprises about 270 parts by weight of edible oil or fat and about 630 parts by weight of sugar, about 350 parts by weight of corn kernels being added to said coating mass in step (b).

6. A method as claimed in claim 1, wherein the edible oil or fat is a vegetable oil or fat.

7. A method as claimed in claim 1, wherein the coating mass additionally contains a flavoring substance and/or a food coloring colorant.

* * * * *